United States Patent

[11] 3,565,097

| [72] | Inventors | Robert B. Costa<br>Covina;<br>Ali Marandi, Azusa, Calif. |
|---|---|---|
| [21] | Appl. No. | 830,957 |
| [22] | Filed | June 6, 1969 |
| [45] | Patented | Feb. 23, 1971 |
| [73] | Assignee | Clemar Manufacturing Corp.<br>Azusa, Calif. |

[54] VACUUM RELIEF ANTI-BACKFLOW AND SHUT-OFF VALVE
6 Claims, 5 Drawing Figs.

[52] U.S. Cl............................................................ 137/218
[51] Int. Cl............................................................ E03c 1/00,
F16k 45/00
[50] Field of Search............................................. 137/217,
218, 102, 107

[56] References Cited
UNITED STATES PATENTS

| 2,730,117 | 1/1956 | Svirsky | 137/217 |
| 3,416,556 | 12/1968 | Nelson | 137/218 |

*Primary Examiner*—Robert G. Nilson
*Attorney*—Lyon & Lyon

ABSTRACT: A manually operated shutoff valve which includes a floating valve disk automatically operable, when open, to provide vacuum relief and, when closed, to prevent backflow, and which incorporates a flow directing ring above the shutoff valve operable to direct water against the floating valve disk to cause immediate closure irrespective of the rate at which the shutoff valve is opened.

PATENTED FEB 23 1971 3,565,097

ROBERT B. COSTA
ALI MARANDI
INVENTORS

BY Lyon+Lyon
ATTORNEYS

VACUUM RELIEF ANTI-BACKFLOW AND SHUT-OFF VALVE

BACKGROUND AND SUMMARY OF THE INVENTION

This invention is related to a copending application, Ser. No. 612,867, filed Jan. 31, 1967 issued Jul. 8, 1969 as Pat. No. 3,454,032. The valve disclosed in the copending application and in the present application has in common a vacuum relief port located under the handle, the handle being in the form of an inverted cup. Also, in both cases, a screw-threaded actuator operated by the handle urges the shutoff valve toward its seat against upstream pressure, and a free moving valve disc is slidable on a stem extending between the vacuum relief port and the shutoff valve. The valve disc is forced against the vacuum relief port by water entering the valve chamber.

In the operation of the valve disclosed in the copending application, when the shutoff valve was opened, particularly if the shutoff valve was opened slowly, the valve disc would not always close the vacuum relief port immediately, with the result that some water would discharge from under the handle.

The primary object of the present invention is to provide means for ensuring immediate closing of the vacuum relief valve port, when the shutoff valve is opened, without impairing the vacuum relief function of the valve.

A further object is to create a positive rather than a negative pressure immediately above the shutoff valve when it is opened so as to drive the vacuum relief valve to its closed position.

A still further object is to provide a novel vacuum relief valve having a yieldable sealing disc and a backing member, the sealing disc engaging an annular vacuum relief port having radially inner and radially outer valve seals, and the valve disc being vented between the seats to prevent entrapment of liquid thereunder or the creation of a force which would lift the sealing disc from the backing member.

Figure 1:
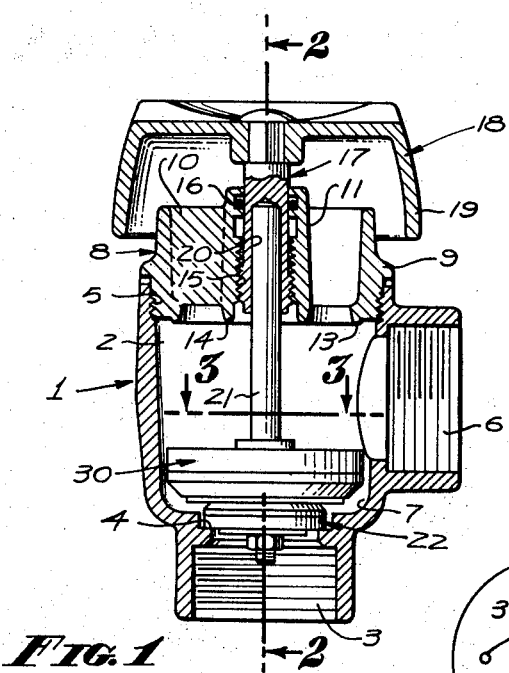
FIG. 1 is a sectional view of the combination vacuum relief, antibackflow and shutoff valve, taken in the plane of the common axis of the inlet and outlet; the shutoff valve element being shown in its closed position, and the vacuum relief valve element being shown in its open position.

The vacuum relief, antibackflow and shutoff valve includes a valve body 1, which forms a valve chamber 2, the lower side of which communicates with an inlet port 3, terminating in an upwardly facing valve seat 4. The inlet port is internally screw-threaded for connection to a water supply line.

The opposite or upper side of the valve chamber is provided with an internally screw-threaded valve bonnet opening 5. At one lateral side, the valve chamber communicates with a side outlet port 6, for connection to a discharge line.

The bottom side of the valve chamber 2 is depressed below the side outlet port 6, forming a recess 7, surrounding the valve seat 4.

The valve bonnet opening 5 receives a cylindrical bonnet 8, which includes an externally screw-threaded outer member 9 for cooperation with the internal screwthreads of the opening 5. Concentrically located, with respect to the outer member 9, and connected thereto by webs 10, is an inner member 11. The annular space formed between the members 9 and 11 forms a vent port 12. The lower extremity of the outer member 9, facing into the chamber 2, forms a radially outer valve seat 13; whereas the lower extremity of the inner member 11 forms a radially inner valve seat 14. The valve seats 13 and 14 are coplanar.

The inner member 11 forms a bore, having screwthreads 15, and receives a seal ring 16. The bore formed by the inner member receives a valve actuator 17, having screwthreads cooperating with the screwthreads 15. Attached to the outer end of the actuator 17, is a handle 18, in the form of an inverted cup; that is, the handle member is provided with an annular skirt 19, which encloses the outer portion of the bonnet 8.

The actuator 17 is provided with a downwardly opening recess 20, which receives a valve stem 21. Mounted at the lower end of the valve stem is a control or shutoff valve element 22, formed of rubber or other elastomer. The shutoff valve element is retained between an upper washer 23 and a lower washer 24 by a shoulder on the valve stem 21 and a nut 25.

Mounted on the stem 21 immediately above the washer 23 is a deflector 26. The deflector includes a hub 27 secured on the stem 21 between a shoulder and the valve element 22. Webs 28 radiate from the hub, and a concentric deflector ring 29 is supported by the webs. The deflector ring projects radially beyond the valve element 22 and upper washer 23 and forms upwardly converging conical walls. The deflector causes a portion of the water flowing axially past the valve element to be deflected radially inwardly and jet axially along the valve stem 21.

Slidably mounted for free movement on the valve stem 21 is a vacuum relief or vent port valve 30. The valve 30 includes a mounting disc 31 having a recess 32 formed in its under side provided with conical wall fittings over the upper side of the deflector 26. The outer periphery of the mounting disc 31 is provided with an annular retainer channel 33. The upper side of the mounting disc is provided with a flanged hub extension 34.

The mounting disc 31 is covered by a valve element 35 formed of rubber or other elastomer and having a central opening so that the center of the valve element is fitted under the flanged end of the hub extension 34. The outer periphery of the valve element is provided with an inturned flange 36 which is received in the retainer channel 33. The valve element 35 engages both valve seats 13 and 14 and is provided with pressure equalizing ports or perforations 37 in the region between the seats.

Operation of the valve structure shown is as follows:

Normally the valve functions as a shutoff or control valve. That is, adjustment of the handle 18 permits the water below the shutoff valve element 22 to open the valve element a distance determined by the position of the actuator 17 within the inner member 11.

Figure 2:
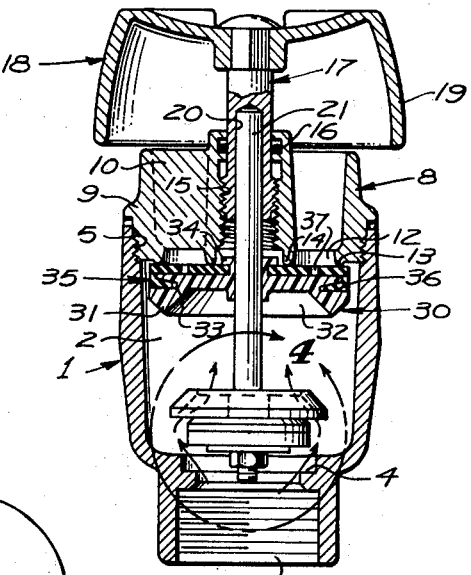
FIG. 2 is a sectional view thereof, taken substantially through 2-2 of FIG. 1, showing the shutoff valve element in its fully open position, and the vacuum relief valve element in its closed position.
Figure 3:
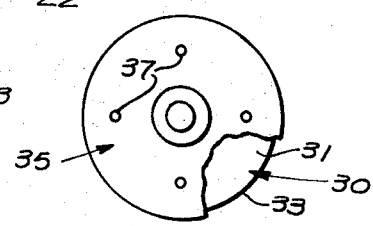
FIG. 3 is a top view of the vacuum relief valve element.
Figure 4:
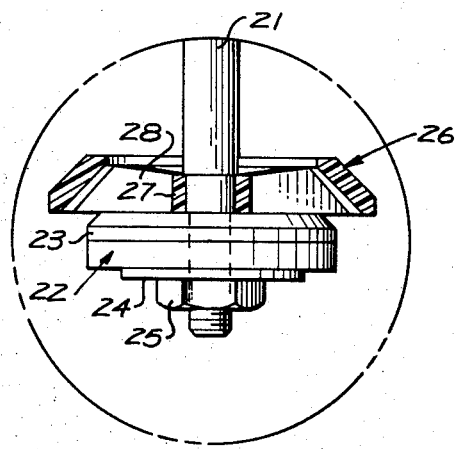
FIG. 4 is an enlarged fragmentary sectional view of the shutoff valve, taken within Circle 4 of FIG. 3.
Figure 5:
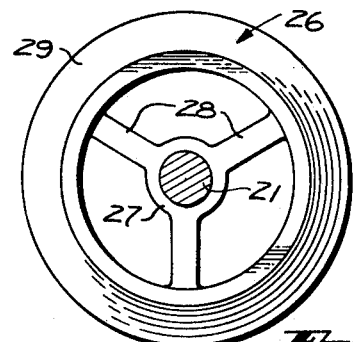
FIG. 5 is a plan view of the deflector.

Under this condition of normal operation, the water pressure within the valve chamber 2 is higher than atmospheric pressure outside the valve body. As a consequence, the internal water pressure forces the vacuum relief or vent port valve 30 to its closed position, as shown in FIG. 2.

Should a vacuum develop in the line upstream of the shutoff valve element 22, the shutoff valve element will tend to remain closed irrespective of the position of the handle. The valve 30 will be open under these conditions.

Should the valve 22 leak or permit backflow under the conditions of a negative downstream pressure, a negative pressure will develop in the valve chamber 2 and the valve 30 will function as a vacuum relief valve or antisiphon valve and open.

The foregoing description of the operation of the valve is the same as the operation of the valve disclosed in the aforementioned copending application. However, in the case of the previous valve, under some conditions when the shutoff valve was manually opened, an apparent time delay occurred before the vent port valve 30 would close the vent port 12, for water would discharge momentarily from under the handle 18. It is believed that this condition wad due to the fact that a momentary negative pressure is produced under the vent port valve 30 due to the flow of water upwardly around the periphery of the shutoff valve 22. Whatever the reason for the momentary flow, the placement of the deflector 26 above the shutoff valve caused virtually instantaneous closure of the vent valve port 12, as evidenced by the fact that usually no water flow occurs, or should it occur, the amount is minimal.

It is believed that two factors contribute to the successful operation of the valve arranged as herein described: namely, radially inward deflection of the water so that it jets upwardly along the stem and impinges against the vent port discs 30, and the reaction of the jetting water as it is deflected downwardly by the conical walls of the recess 32.

It is desirable that the valve element 35 be retained on the mounting disc as indicated rather than cemented thereon; however, for reasons which are not quite clear, the valve element will be forced off the mounting disc in the course of opening or closing the shutoff valve. This condition is avoided by provisions of the small perforations 37.

While particular embodiments of this invention have been shown and described, it is not intended to limit the same to the details of the constructions set forth, but instead, the invention embraces such changes, modifications and equivalents of the various parts and their relationships as come within the purview of the appended claims.

We claim:

1. A valve comprising:
  a. a valve body structure including a valve chamber, an inlet at the lower end thereof, a vent outlet at the upper end thereof in coaxial relation to the inlet, and a side outlet;
  b. a valve stem means extending through said vent outlet and axially movable in said valve chamber;
  c. a valve element secured to the lower end of the valve stem and movable thereby to open and close said inlet;
  d. a valve disc slidable on said valve stem for opening and closing said vent outlet;
  e. and a deflector mounted on said stem adjacent said valve element for directing liquid flowing upwardly around said valve element into a constricted path adjacent said stem thereby to impinge on said valve disc and drive said valve disc upwardly on said stem and close said vent outlet.

2. A valve, as defined in claim 1, wherein:
  a. said vent outlet has an annular inner seat and an annular outer seat;
  b. said valve disc includes an upwardly facing seating surface, a flat annular valve washer retained at its margins on said seating surface, and engageable with both of said vent outlet seats, said valve washer having perforations in the area between its regions of engagement with said vent outlet seats.

3. A valve, as defined in claim 1, wherein:
  a. said deflector includes upwardly converging conical walls having a major diameter greater than the diameter of said valve element;
  b. the under side of said valve disc forms a recess having upwardly converging conical walls of greater diameter than the conical walls of said deflector whereby liquid flowing upwardly from said deflector is redirected downwardly and outwardly from the under side of said valve disc.

4. The combination with a valve including a valve body structure having a valve chamber, an inlet at the lower end of the valve chamber bordered by an inlet seat, an annular vent outlet at the upper end of the valve chamber in coaxial relation with the inlet, said vent outlet being bordered by radially inner and radially outer vent valve seats, and a side outlet leading from the valve chamber; a valve stem means having a screw-threaded port extending through the output port, and an axially movable stem part; and a valve member carried by said part engageable with said inlet seat, of a vent outlet closing means comprising:
  a. a deflector member secured to said stem part contiguous to said valve member and including an annular upwardly converging wall the lower extremity of which projects radially beyond the valve member to capture water flowing upwardly around said valve member and redirect the water upwardly contiguous to the stem part;
  b. and a valve disc freely slidable on said stem part between a lower position contiguous to said deflector member and an upper position engaging said vent outlet seats whereby water issuing from said deflector member forcibly drives said valve disc to its upper position.

5. a vent outlet closing means, as defined in claim 4, wherein:
  a. the upper side of said valve disc is covered by an annular valve washer disc sealingly retained thereon at its radially inner and radially outer margins, said valve washer disc having annular regions engageable by said vent outlet seats, and perforated between said regions to vent water accumulations from under said valve washer disc.

6. A vent outlet closing means, as defined in claim 4, wherein:
  a. the under side of said valve disc is provided with a redeflecting recess of larger area than said deflector member.